(12) United States Patent
Henry et al.

(10) Patent No.: US 8,176,797 B2
(45) Date of Patent: May 15, 2012

(54) SYSTEM AND METHOD FOR MEASURING FLOW RATE FROM A METER ROLLER

(75) Inventors: Jim Henry, Saskatoon (CA); Joel Gervais, Saskatoon (CA); Devon Schollar, Regina (CA); Scott David Noble, Saskatoon (CA); Ka Po Catherine Hui, Saskatoon (CA)

(73) Assignee: CNH Canada, Ltd. (CA)

( * ) Notice: Subject to any disclaimer, the term of this patent is extended or adjusted under 35 U.S.C. 154(b) by 466 days.

(21) Appl. No.: 12/554,669

(22) Filed: Sep. 4, 2009

(65) Prior Publication Data

US 2011/0056308 A1    Mar. 10, 2011

(51) Int. Cl.
    *G01F 1/30*    (2006.01)
    *B65G 21/10*   (2006.01)
    *B65G 65/02*   (2006.01)

(52) U.S. Cl. ................ 73/861.73; 198/312; 198/300

(58) Field of Classification Search ........... 73/861.73; 198/312, 300, 813
    See application file for complete search history.

(56) References Cited

U.S. PATENT DOCUMENTS

| | | | |
|---|---|---|---|
| 3,483,755 A | 12/1969 | Walker et al. | |
| 3,640,136 A * | 2/1972 | Nolte | ........................ 73/861.73 |
| 4,054,784 A | 10/1977 | Ricciardi et al. | |
| 4,693,122 A | 9/1987 | Griffith | |
| 4,949,570 A | 8/1990 | Harmon et al. | |
| 5,177,470 A | 1/1993 | Repas | |
| 5,207,281 A | 5/1993 | Wells et al. | |
| 5,260,880 A | 11/1993 | Tump | |
| 5,635,911 A | 6/1997 | Landers et al. | |
| 5,738,153 A | 4/1998 | Gerling et al. | |
| 5,775,532 A | 7/1998 | Bullivant | |
| 5,798,466 A * | 8/1998 | Satake et al. | ............... 73/861.73 |
| 5,923,262 A | 7/1999 | Fuss et al. | |
| 5,924,370 A | 7/1999 | Gregor et al. | |
| 5,952,584 A * | 9/1999 | Strubbe | ...................... 73/861.73 |
| 6,070,539 A | 6/2000 | Flamme et al. | |
| 6,091,997 A | 7/2000 | Flamme et al. | |
| 6,193,175 B1 | 2/2001 | Andersson et al. | |
| 6,367,336 B1 | 4/2002 | Martina et al. | |
| 6,471,032 B2 * | 10/2002 | Busschaert et al. | ........... 198/312 |
| 6,672,342 B2 | 1/2004 | Nussbaumer | |
| 6,814,810 B2 | 11/2004 | Prentice et al. | |
| 6,823,272 B2 | 11/2004 | Sutton | |
| 7,075,019 B2 | 7/2006 | Bergman et al. | |
| 7,100,522 B2 | 9/2006 | Mayerle | |

OTHER PUBLICATIONS

Schollar et al.; "Measuring and Defining Continuous Flow of Fluter Meter Rollers," University of Saskatchewan, Agricultural and Bioresource Engineering; Dec. 5, 2008.

* cited by examiner

*Primary Examiner* — Jewel V Thompson
(74) *Attorney, Agent, or Firm* — Rebecca Henkel

(57) ABSTRACT

A system and method are provided for quantifying a degree of discontinuity of material flow from a meter roller. In an exemplary embodiment, flowable particulate material is fed into a meter roller. The meter roller is then rotated one revolution, and the output from the meter roller is collected and measured. Next, the meter roller is rotated one revolution in discrete increments, each increment having a substantially equal rotational angle. The output from the meter roller is then collected and measured for each increment. Finally, the measurement for each increment is compared to the measurement for the one revolution to determine a statistical parameter indicative of flow rate discontinuity.

20 Claims, 5 Drawing Sheets

SYSTEM AND METHOD FOR MEASURING FLOW RATE FROM A METER ROLLER

BACKGROUND

The invention relates generally to a system and method for measuring material flow rate from a meter roller, and more specifically, to quantifying meter roller flow rate discontinuities.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. In certain configurations, air carts are towed behind the seeders to deliver a desired flow of seeds to the row units.

Air carts generally include a seed storage tank, an air source (e.g., a blower) and a metering assembly. The seeds are typically gravity fed from the storage tank to the metering assembly that distributes a desired volume of seeds into an air flow generated by the air source. The air flow then carries the seeds to the row units via conduits extending between the air cart and the seeders. The metering assembly typically includes meter rollers or other metering devices that regulate the flow of seeds based on meter roller geometry and rotation rate. However, because typical meter rollers employ a series of flutes and recesses to control the flow of seeds, the flow is generally discontinuous with respect to space and time. The degree of discontinuity generally increases for low meter roller rotation speeds, such as those typically employed for smaller grains (e.g., canola, mustard, etc.).

Delivering seeds to the row units at a desired and continuous rate ensures proper seed distribution within the soil. Unfortunately, the discontinuity in seed flow rate from the meter rollers increases the difficulty associated with flow rate measurement and adjustment. Consequently, it is desirable to develop a system and method for measuring flow rate discontinuity from current meter roller designs and quantifying the degree of discontinuity. Such a configuration may facilitate development of future meter rollers that provide enhanced flow characteristics.

BRIEF DESCRIPTION

The present invention provides a system and method for quantifying the degree of discontinuity of material flow from a meter roller. In an exemplary embodiment, flowable particulate material (e.g., seeds, fertilizer, etc.) is fed into a meter roller. The meter roller is then rotated one revolution, and the output from the meter roller is collected and measured. Next, the meter roller is rotated one revolution in discrete increments, each increment having a substantially equal angular rotation. The output from the meter roller is then collected and measured for each increment. Finally, the measurement for each increment is compared to the measurement for the one revolution to determine a statistical parameter indicative of flow rate discontinuity (e.g., standard deviation). This method facilitates evaluation and comparison of various meter roller designs, and may provide valuable data for enhancing meter roller particle flow properties.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
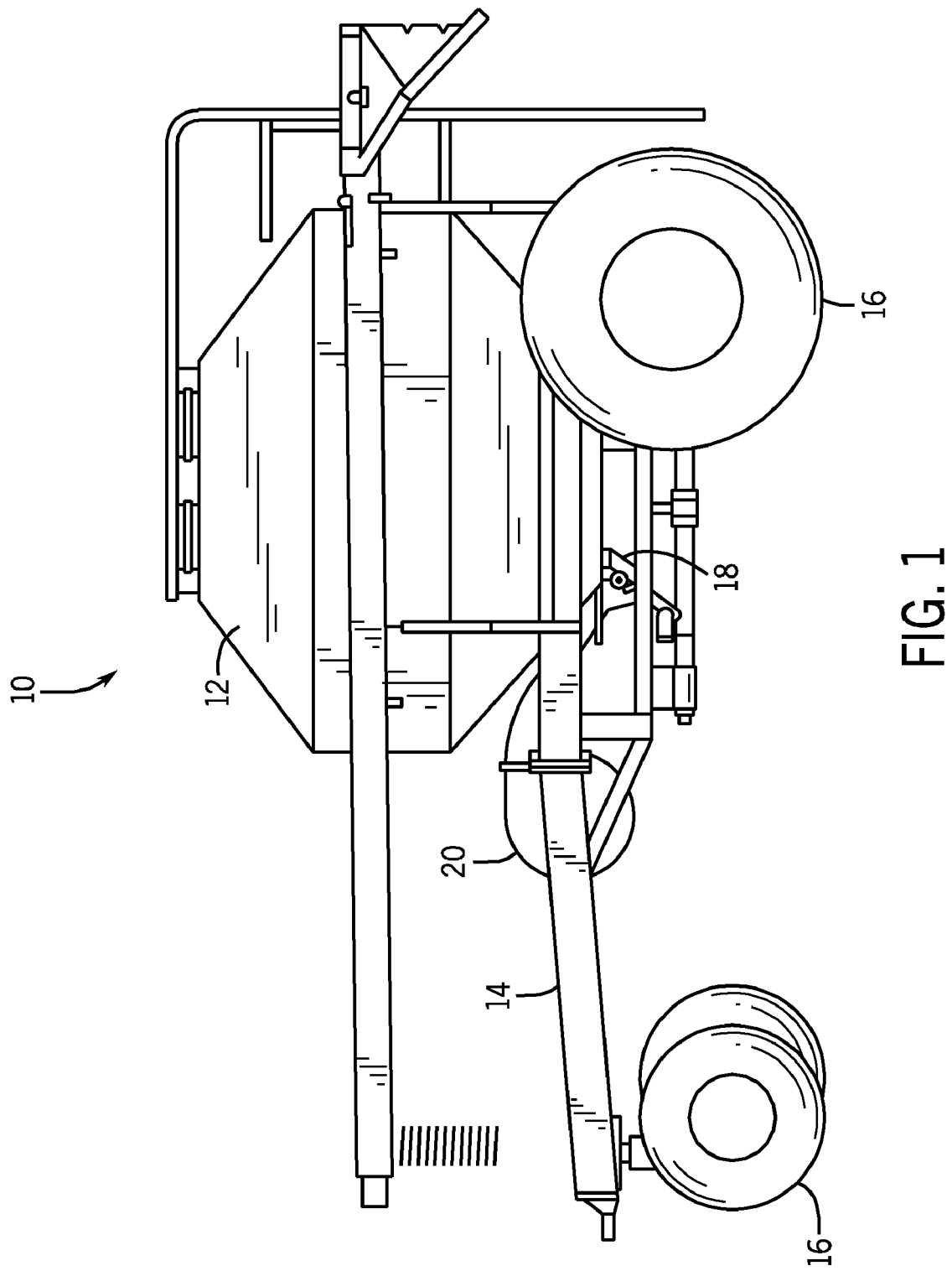
FIG. 1 is a side view of an air cart, including a metering assembly configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer.

In the illustrated embodiment, the air cart 10 includes a storage tank 12, a frame 14, wheels 16, a metering assembly 18 and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering assembly 18. The metering assembly 18 includes meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
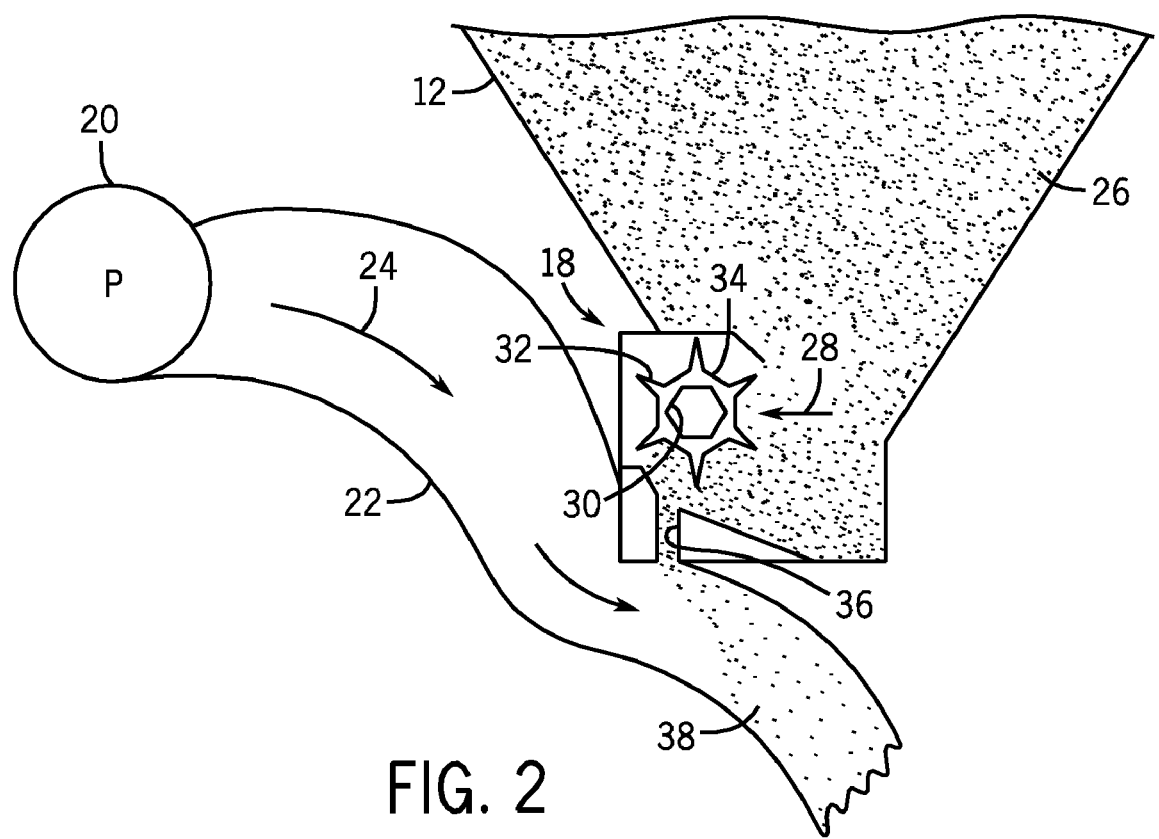
FIG. 2 is a schematic view of the metering assembly, as shown in FIG. 1, including a meter roller.

FIG. 2 is a schematic view of the metering assembly 18, as shown in FIG. 1. As illustrated, the air source 20 is coupled to a conduit 22 configured to flow air 24 past the metering assembly 18. The air source 20 may be a pump or blower powered by an electric or hydraulic motor, for example. Flowable particulate material 26 (e.g., seeds, fertilizer, etc.) within the storage tank 12 flows by gravity into the metering assembly 18. The metering assembly 18 includes one or more meter rollers 28 configured to regulate the flow of material 26 into the air flow 24. More particularly, the metering assembly 18 may include multiple meter rollers 28 disposed adjacent to one another along a longitudinal axis of the rollers 28. For example, certain metering assemblies 18 include seven meter rollers 28. Such assemblies 18 are known as "7-run" metering assemblies. However, alternative embodiments may include more or fewer meter rollers 28, e.g., 5, 6, 7, 8, 9, or more. Further embodiments may include one continuous meter roller 28.

Each meter roller 28 includes an interior cavity 30 configured to receive a shaft that drives the meter roller 28. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 28. Alternatively, the meter rollers 28 may be coupled to a wheel 16 by a gear assembly such that rotation of the wheel 16 drives the meter rollers 28 to rotate. Such a configuration will automatically vary the rotation rate of the meter rollers 28 based on the speed of the air cart 10.

Each meter roller 28 also includes multiple flutes 32 and recesses 34. The number and geometry of the flutes 32 are particularly configured to accommodate the material 26 being distributed. The illustrated embodiment includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 28 controls the flow of material 26 into the air stream 24. Specifically, as the meter roller 28 rotates, material is transferred through an opening 36 in the metering assembly 18 into the conduit 22. The material then mixes with air from the air source 20, thereby forming an air/material mixture 38. The mixture then flows to the row units of the implement via pneumatic conduits, where the seeds and/or fertilizer are deposited within the soil. As will be appreciated by those skilled in the art, if the flow of material from the meter roller 28 is not continuous, the air/material mixture 38 will not be substantially uniform. Therefore, measurement of material flow rate from the metering assembly 18 will be difficult and/or the row units will not receive a continuous supply of seeds and/or fertilizer, resulting in an uneven distribution through the field. Consequently, the present system and method for measuring meter roller flow rate may be employed to develop meter rollers configured to provide a more even flow of material to the row units.

Figure 3:
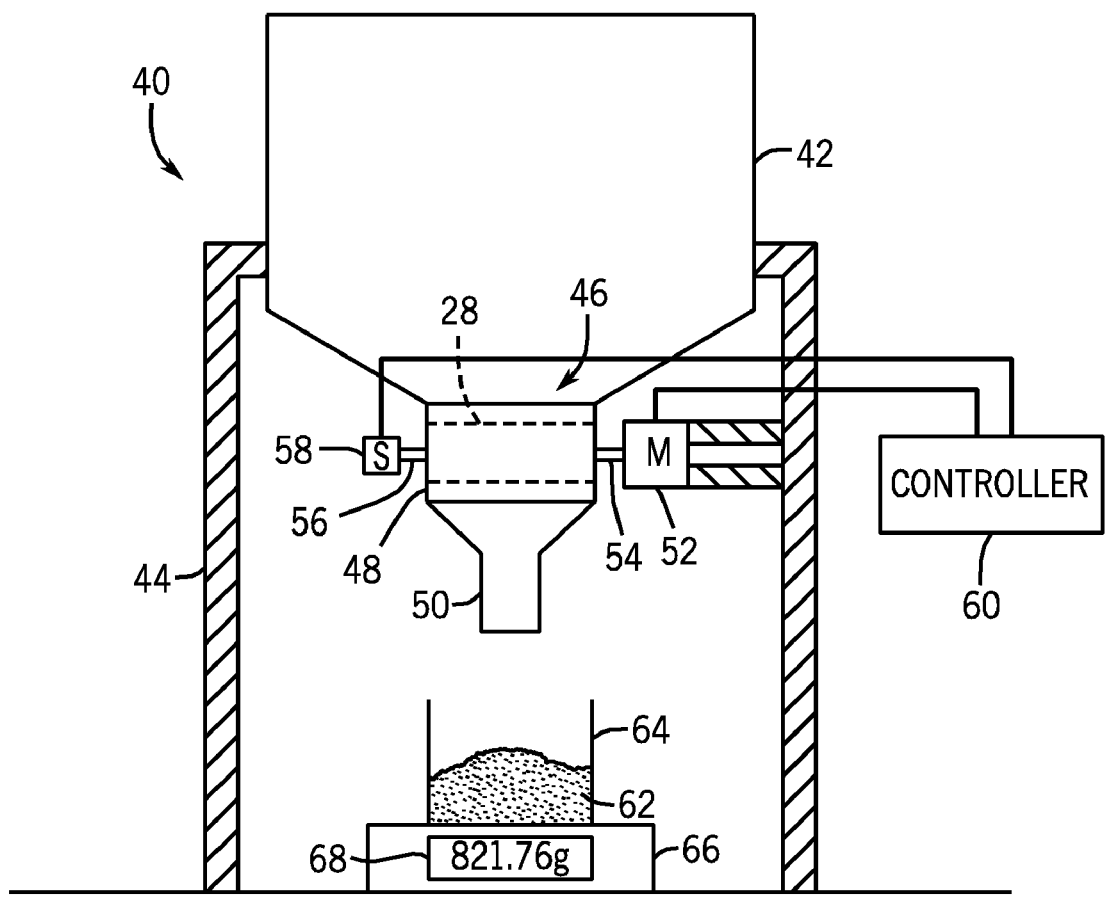
FIG. 3 is a schematic view of a system for measuring flow rate from a meter roller, such as the meter roller shown in FIG. 2.

FIG. 3 is a schematic view of a system 40 for measuring flow rate from a meter roller 28. While a meter roller 28 is employed within the system 40 of the present embodiment, alternative embodiments may employ other metering devices such as augers or rotary valves, for example. In the present embodiment, the system 40 is configured to determine a degree of flow rate discontinuity from a particular meter roller 28 such that improvements may be made to meter roller designs. The illustrated system 40 includes a storage tank 42 suspended above the ground by a framework 44. A metering assembly 46 is disposed below the storage tank 42. Unlike the metering assembly 18 from the air cart 10, the metering assembly 46 contains a single meter roller 28. This configuration facilitates evaluation of individual meter rollers 28 such that meter roller designs may be accurately compared. However, alternative embodiments may employ multiple meter rollers 28 within the metering assembly 46. The meter roller 28 is housed within a meter box 48 connected to a chute 50. As discussed in detail below, the chute 50 is configured to direct a flow of material into a container for measurement.

In the present configuration, the meter roller 28 is driven to rotate by a drive unit 52 coupled to the meter roller 28 by a shaft 54. A variety of drive units 52 may be utilized, such as electric, pneumatic or hydraulic motors. In the present embodiment, an electric motion control motor is employed to drive the meter roller 28. The motion control motor is configured to rotate the meter roller precisely and accurately, thereby ensuring repeatable results. A second shaft 56 couples the meter roller 28 to a homing switch 58. The homing switch 58 is configured to indicate when the meter roller 28 is rotated into a starting orientation, thereby ensuring that each test begins from the same meter roller position. Both the drive unit 52 and homing switch 58 are coupled to a controller 60 configured to instruct the drive unit 52 to rotate the meter roller 28 in discrete increments. For example, the controller 60 may be a computer coupled to the drive unit 52 and homing switch 58 by I/O cables (e.g., RS-232, USB, etc.), and configured to control the degree of rotation of the meter roller 28 for each increment. As discussed in detail below, output from the meter roller 28 for each increment is measured to compute flow rate discontinuity.

Material 62 is collected within a container 64 positioned below the chute 50. The container 64 is disposed on a measuring device 66 configured to determine a quantity of material 62 output from the meter roller 28. For example, in the present embodiment, the measuring device 66 is a scale or balance configured to determine a weight or mass of the material 62. The measuring device 66 includes a display 68 configured to output a value indicative of the quantity of material 62 within the container 64. For example, the display 68 on the scale of the present embodiment is illustrated as displaying a mass in grams. In certain configurations, the measuring device 66 is communicatively coupled to a computer or other electronic recording device (e.g., the controller 60) configured to automatically store the output from the measuring device 66. The measurement for each rotational increment is compared to the measurement for one revolution to determine a statistical parameter indicative of flow rate discontinuity.

Figure 4:
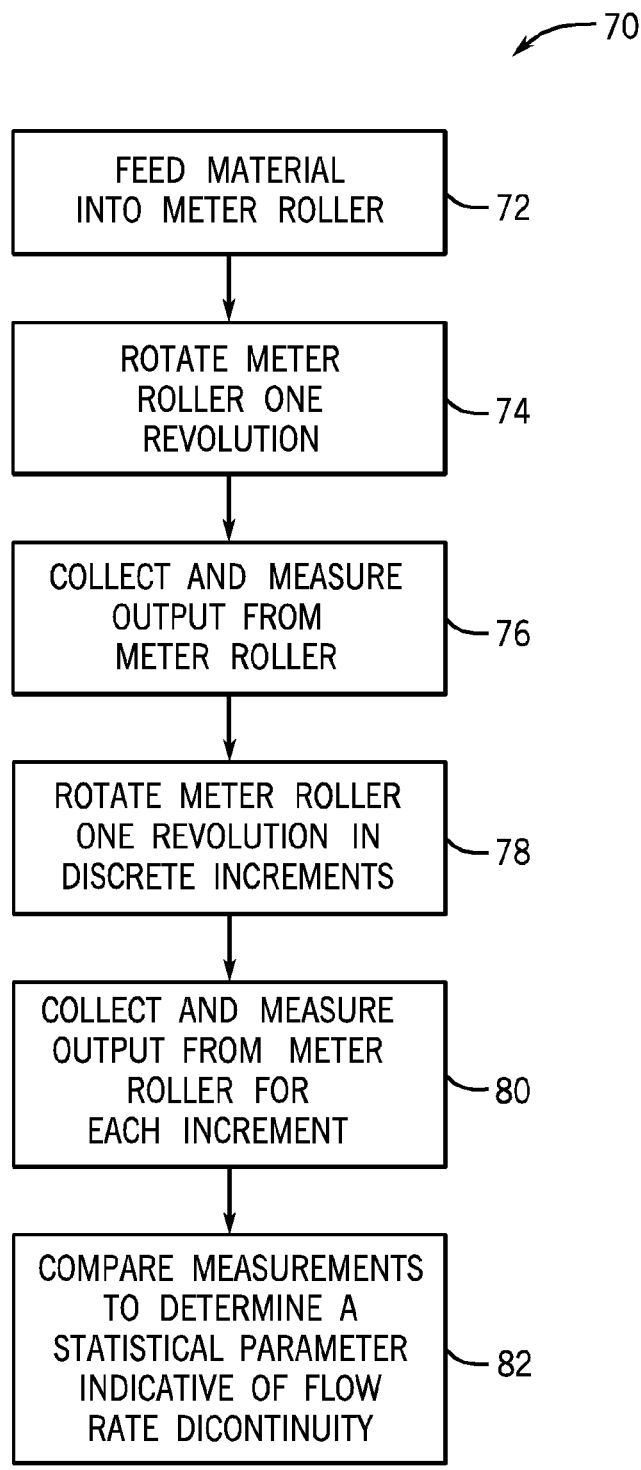
FIG. 4 is a flow chart of a method for determining flow rate discontinuity.

FIG. 4 is a flow chart of a method 70 for measuring flow rate from the meter roller 28. First, as represented by block 72, material is fed into the meter roller. In the system 40 of FIG. 3, the material is fed by gravity from the storage tank 42 to the metering assembly 46 housing the meter roller 28. The meter roller 28 is then rotated one revolution, as represented by block 74. Specifically, the controller 60 operates the drive unit 52 such that the meter roller 28 rotates. Output material 62 from the meter roller 28 is then collected and measured, as represented by block 76. In the present embodiment, material from the meter roller 28 passes through the chute 50 and collects in the container 64. The material 62 is then measured by the scale 66, and the mass is either manually or automatically recorded. In an alternative embodiment, the meter roller 28 may be rotated through multiple complete revolutions. In such an embodiment, the total measured output from the meter roller 28 may be divided by the number of revolutions to determine the output for one revolution. In general, the meter roller 28 may be rotated through a predetermined distance to establish an average flow rate.

The meter roller 28 is then rotated one revolution, or the predetermined distance, in discrete increments, as represented by block 78. Specifically, the meter roller 28 is first rotated until the homing switch 58 indicates that the starting position has been reached. The controller 60 then instructs the drive unit 52 to rotate the meter roller 28 through a desired angle of rotation less than one complete revolution. For example, in certain embodiments, the controller 60 instructs the drive unit 52 to rotate the meter roller 28 in 6 degree increments through one complete revolution. In other words, the meter roller 28 rotates through 60 six degree increments to achieve one complete revolution. Alternative embodiments may rotate the meter roller in 2.5, 4, 5, 12, or 24 degree increments, for example. Further embodiments may utilize increments having a rotational angle of approximately between 2.5 to 12, 4 to 6, or about 6 degrees. The material 62 is collected and measured after each rotational increment, as represented by block 80. For example, the mass shown on the display 68 is recorded after each increment, and the mass of material output for each increment is computed by subtracting the current mass from the previous measurement.

After measuring the output for one complete revolution and one revolution in discrete increments, a statistical parameter indicative of flow rate discontinuity is determined based on the measurements, as represented by block 82. In certain embodiments, the mass from the one complete revolution is divided by the number of rotational increments to determine an average or theoretical output for each increment. For example, if the meter roller 28 is rotated in 60 six degree increments, the mass of material from the one complete revolution is divided by 60 to compute the theoretical output from a six degree rotation, i.e., the output assuming each increment yields the same quantity of material. The measured values for each increment are then compared to the theoretical output to compute a standard deviation from the theoretical output, the standard deviation representing a parameter indicative of flow rate discontinuity.

Standard deviation s is defined according to the following formula:

$$s = \sqrt{\frac{\sum_{i=1}^{n}(x_i - \bar{x})^2}{n-1}}$$

where $x_i$ is the mass at increment i, $\bar{x}$ is the average output based on the one complete revolution, and n is the number of increments. Standard deviation s is a measure of the degree of deviation of the data points from the average. The higher the standard deviation, the greater the divergence of points from the average. The lower the standard deviation, the smaller the divergence of points from the average. Therefore, standard deviation s is an effective representation of the magnitude of flow discontinuity from a meter roller 28. A high standard deviation indicates that the flow varies significantly through one revolution, while a low standard deviation indicates that the flow rate is substantially continuous.

Therefore, flow rate discontinuity between meter rollers 28 may be directly compared based on the standard deviation computed using the method 70. Consequently, a meter roller 28 may be designed to provide enhanced flow properties (i.e., lower standard deviation) for a particular seed or fertilizer. Therefore, output from the meter roller may be better controlled during operation of the air cart to enhance distribution of seeds and/or fertilizer within the soil.

Figure 5:
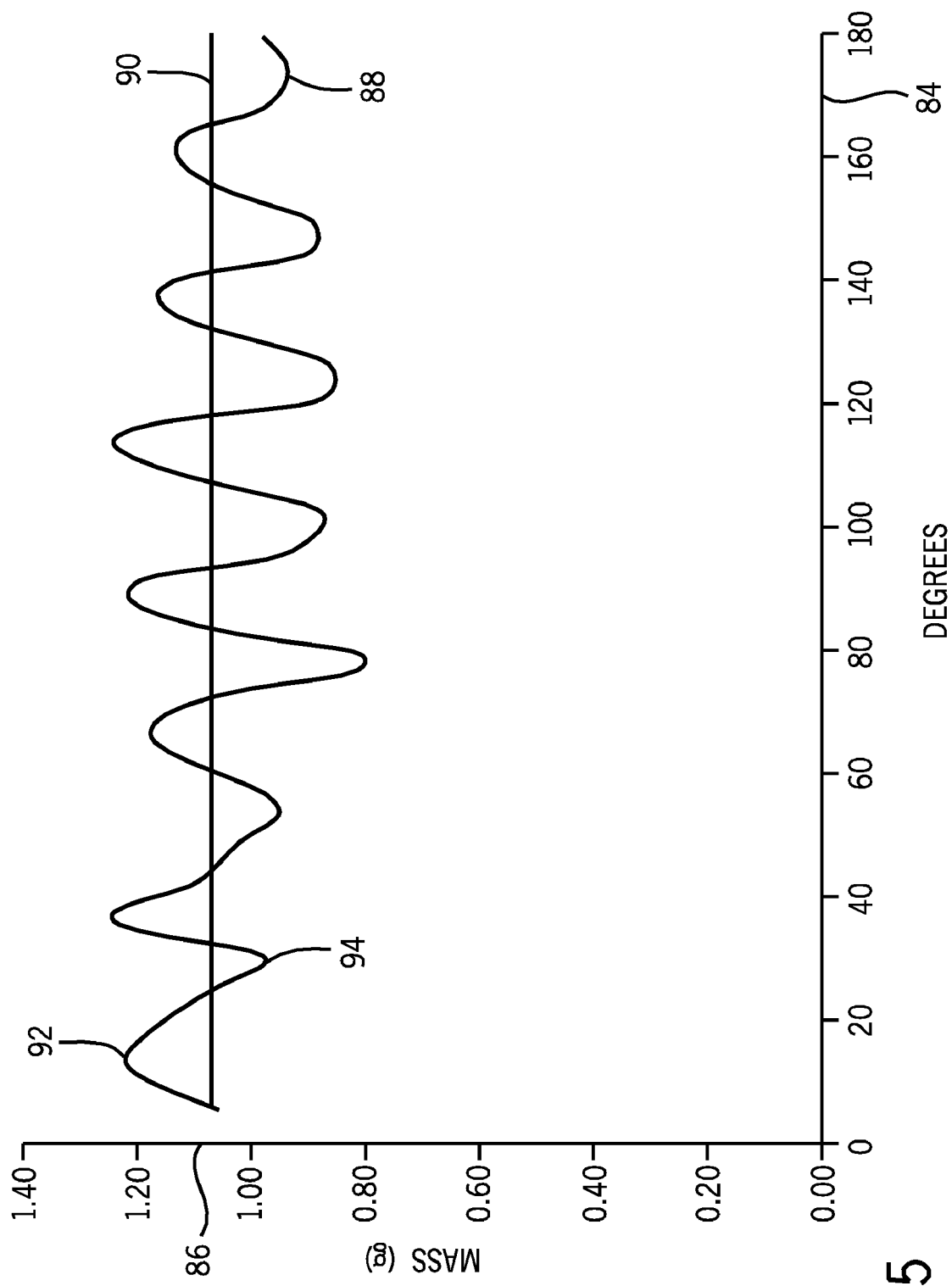
FIG. 5 is a graph of mass output from a meter roller versus the rotation of the meter roller, obtained via the system and method of the previous figures.

FIG. 5 is a sample graph of mass output from a meter roller versus the degree of rotation of the meter roller. As illustrated, a horizontal axis 84 represents the degree of rotation of the meter roller, and a vertical axis 86 represents the mass output from the meter roller. Curve 88 represents the mass output from the meter roller for each increment. Specifically, curve 88 corresponds to the output of a meter roller rotated through 180 degrees in 6 degree increments. As will be appreciated by those skilled in the art, the curve 88 will vary based on the increment size (e.g., 2.5, 5, 12, or 24 degree increments). However, experimentation has determined that a six degree increment provides useful statistical data for evaluation of a particular meter roller. Curve 90 represents the average or theoretical output for a six degree rotation of the meter roller. As previously discussed, this value is computed by dividing the output from one revolution by the number of increments, i.e., 60 for six degree increments.

The peaks 92 represent the points of highest mass flow, and the troughs 94 represents the points of lowest mass flow. The data represented by the present graph was collected from a meter roller having flutes spaced every 24 degrees about the circumference. Consequently, the peaks 92 and troughs 94 are separated from each other by approximately 24 degrees. Specifically, as the recess 34 delivers material into the chute 50, the flow rate increases. As the flute 32 blocks the flow of material, the flow rate decreases. As a result of this process, the curve 88 will vary based on the particular meter roller being tested. Graphs of mass versus degree of rotation such as curve 88 provide a useful reference for visually depicting the degree of flow discontinuity from a meter roller. Consequently, meter rollers may be designed to minimize the height of the peaks and troughs to establish a more even flow from the meter roller during operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for measuring a flow rate from a metering device, comprising:
    feeding a flowable particulate material into the metering device;
    rotating the metering device a predetermined distance;
    collecting and measuring the flowable particulate material output from the metering device;
    rotating the metering device the predetermined distance in discrete increments, wherein a rotational angle of each increment is substantially the same;
    collecting and measuring the flowable particulate material output from the metering device for each increment; and
    comparing the measurement for each increment with the measurement for the predetermined distance to determine a statistical parameter indicative of flow rate discontinuity.

2. The method of claim 1, wherein the rotational angle of each increment is approximately between 2.5 to 12 degrees.

3. The method of claim 1, wherein each measuring step comprises determining a mass of the output flowable particulate material.

4. The method of claim 1, wherein comparing the measurement for each increment with the measurement for the predetermined distance comprises dividing the measurement for the predetermined distance by number of increments to determine an average.

5. The method of claim 4, wherein the statistical parameter indicative of flow rate discontinuity is a standard deviation between the measurement for each increment and the average.

6. The method of claim 1, comprising plotting the measurement for each increment as a function of the degree of rotation to determine deviation from an average equal to a quotient of the measurement for the predetermined distance divided by number of increments.

7. A method for measuring a flow rate from a meter roller, comprising:
rotating the meter roller through a rotational angle less than one revolution;
measuring output from the meter roller; and
comparing the measurement to a theoretical value equal to an output of the meter roller for one revolution divided by the rotational angle.

8. The method of claim 7, wherein the rotational angle is approximately 6 degrees.

9. The method of claim 7, wherein measuring output from the meter roller comprises determining a mass of the output.

10. The method of claim 7, comprising rotating the meter roller one revolution in increments equal to the rotational angle.

11. The method of claim 10, comprising measuring output from the meter roller for each increment.

12. The method of claim 11, comprising comparing the measurement for each increment to the theoretical value to determine a statistical parameter indicative of flow rate discontinuity.

13. The method of claim 12, wherein the statistical parameter indicative of flow rate discontinuity is a standard deviation between the measurement for each increment and the theoretical value.

14. The method of claim 11, comprising plotting the measurement for each increment as a function of the rotational angle to determine deviation from the theoretical value.

15. An apparatus for measuring a flow rate from a meter roller, comprising:
a metering assembly configured to receive a flowable particulate material;
a meter roller disposed within the metering assembly;
a drive unit coupled to the meter roller and configured to rotate the meter roller within the metering assembly;
a drive unit controller communicatively coupled to the drive unit and configured to instruct the drive unit to rotate the meter roller in discrete increments each less than one complete revolution of the meter roller; and
a measuring device configured to receive flowable particulate material output from the metering assembly.

16. The apparatus of claim 15, comprising a container configured to store the flowable particulate material for delivery to the metering assembly.

17. The apparatus of claim 15, comprising a homing switch communicatively coupled to the drive unit controller and configured to indicate when the meter roller has rotated into a starting orientation.

18. The apparatus of claim 15, wherein the drive unit comprises an electrically driven motion control motor.

19. The apparatus of claim 15, wherein the measuring device comprises a scale configured to determine a mass of the flowable particulate material.

20. The apparatus of claim 15, wherein the discrete increments are approximately 6 degrees.

* * * * *